(12) United States Patent
Comb et al.

(10) Patent No.: US 9,868,255 B2
(45) Date of Patent: Jan. 16, 2018

(54) ELECTROPHOTOGRAPHY-BASED ADDITIVE MANUFACTURING WITH PRE-SINTERING

(71) Applicant: Stratasys, Inc., Eden Prairie, MN (US)

(72) Inventors: James W. Comb, Hamel, MN (US); J. Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 541 days.

(21) Appl. No.: 14/218,102

(22) Filed: Mar. 18, 2014

(65) Prior Publication Data

US 2015/0266237 A1 Sep. 24, 2015

(51) Int. Cl.
*B29C 67/00* (2017.01)
*G03G 15/22* (2006.01)

(52) U.S. Cl.
CPC ...... *B29C 67/0077* (2013.01); *B29C 67/0074* (2013.01); *G03G 15/224* (2013.01)

(58) Field of Classification Search
CPC ............ B29C 67/0077; B29C 67/0074; G03G 15/224
USPC ........................ 264/308, 401; 425/375, 174.4
See application file for complete search history.

(56) References Cited

U.S. PATENT DOCUMENTS

| | | |
|---|---|---|
| 2,297,691 A | 10/1942 | Carlson |
| 3,666,247 A | 5/1972 | Banks |
| 4,988,602 A | 1/1991 | Jongewaard et al. |
| 5,088,047 A | 2/1992 | Bynum |
| 5,099,288 A | 3/1992 | Britto et al. |
| 5,234,784 A | 8/1993 | Aslam et al. |
| 5,254,421 A | 10/1993 | Coppens et al. |
| 5,354,414 A | 10/1994 | Feygin |
| 5,354,799 A | 10/1994 | Bennett et al. |
| 5,514,232 A | 5/1996 | Burns |
| 5,592,266 A | 1/1997 | Park et al. |
| 5,593,531 A | 1/1997 | Penn |

(Continued)

FOREIGN PATENT DOCUMENTS

| | | |
|---|---|---|
| CN | 101310964 A | 11/2008 |
| EP | 0712051 A2 | 5/1996 |

(Continued)

OTHER PUBLICATIONS

International Search Report and Written Opinion dated May 11, 2015 for corresponding International Application No. PCT/US2015/017971, filed Feb. 27, 2015.

(Continued)

*Primary Examiner* — Nahida Sultana
(74) *Attorney, Agent, or Firm* — Peter J. Ims; Westman, Champlin & Koehler, P.A.

(57) ABSTRACT

A method and system for printing a three-dimensional part, which includes producing a developed layer of a part material with one or more electrophotography engines of an additive manufacturing system, transferring the developed layer from the one or more electrophotography engines to a transfer assembly of the additive manufacturing system, sintering the developed layer at the transfer assembly to produce a sintered contiguous film, cooling the sintered contiguous film down to a transfer temperature, and pressing the cooled sintered contiguous film into contact with an intermediate build surface of the three-dimensional part with a low applied pressure.

20 Claims, 12 Drawing Sheets

(56) References Cited

U.S. PATENT DOCUMENTS

| | | |
|---|---|---|
| 5,594,652 A | 1/1997 | Penn et al. |
| 5,866,058 A | 2/1999 | Batchelder et al. |
| 5,981,616 A | 11/1999 | Yamamura et al. |
| 5,990,268 A | 11/1999 | Dickens, Jr. et al. |
| 6,052,551 A | 4/2000 | De Cock et al. |
| 6,066,285 A | 5/2000 | Kumar |
| 6,169,605 B1 | 1/2001 | Penn et al. |
| 6,206,672 B1 | 3/2001 | Grenda |
| 6,329,115 B1 | 12/2001 | Yamashita |
| 6,376,148 B1 | 4/2002 | Liu et al. |
| 6,509,128 B1 | 1/2003 | Everaerts et al. |
| 6,531,086 B1 | 3/2003 | Larsson |
| 6,780,368 B2 | 8/2004 | Liu et al. |
| 6,799,959 B1 | 10/2004 | Tochimoto et al. |
| 6,815,636 B2 | 11/2004 | Chung et al. |
| 6,887,640 B2 | 5/2005 | Zhang et al. |
| 7,011,783 B2 | 3/2006 | Fong |
| 7,077,638 B2 | 7/2006 | Leyden et al. |
| 7,208,257 B2 | 4/2007 | Cheng et al. |
| 7,261,541 B2 | 8/2007 | Fong |
| 7,261,542 B2 | 8/2007 | Hickerson et al. |
| 7,291,242 B2 | 11/2007 | Khoshnevis |
| 7,435,763 B2 | 10/2008 | Farr et al. |
| 7,706,910 B2 | 4/2010 | Hull et al. |
| 7,815,826 B2 | 10/2010 | Serdy et al. |
| 7,988,906 B2 | 8/2011 | Monsheimer et al. |
| 8,047,251 B2 | 11/2011 | Khoshnevis |
| 8,119,053 B1 | 2/2012 | Bedal et al. |
| 8,123,999 B2 | 2/2012 | Priedeman, Jr. et al. |
| 8,124,192 B2 | 2/2012 | Paasche et al. |
| 8,147,910 B2 | 4/2012 | Kritchman |
| 8,173,258 B2 | 5/2012 | Monsheimer et al. |
| 8,216,757 B2 | 7/2012 | Mizutani et al. |
| 8,221,671 B2 | 7/2012 | Hull et al. |
| 8,246,888 B2 | 8/2012 | Hopkins et al. |
| 8,249,480 B2 | 8/2012 | Aslam et al. |
| 8,459,280 B2 | 6/2013 | Swanson et al. |
| 8,718,522 B2 | 5/2014 | Chillscyzn et al. |
| 2002/0093115 A1 | 7/2002 | Jang et al. |
| 2002/0145213 A1 | 10/2002 | Liu et al. |
| 2002/0162472 A1* | 11/2002 | Liguori ................. B44C 1/1729 101/487 |
| 2003/0087176 A1 | 5/2003 | Ezenyilimba et al. |
| 2004/0232583 A1 | 11/2004 | Monsheimer et al. |
| 2005/0207801 A1 | 9/2005 | Kunii et al. |
| 2005/0218549 A1 | 10/2005 | Farr et al. |
| 2008/0032083 A1 | 2/2008 | Serdy et al. |
| 2008/0169585 A1 | 7/2008 | Zinniel |
| 2008/0169589 A1 | 7/2008 | Sperry et al. |
| 2008/0171284 A1 | 7/2008 | Hull et al. |
| 2008/0192074 A1* | 8/2008 | Dubois ............... B29C 67/0059 347/5 |
| 2008/0226346 A1 | 9/2008 | Hull et al. |
| 2009/0236775 A1 | 9/2009 | Monsheimer et al. |
| 2009/0304952 A1 | 12/2009 | Kritchman |
| 2011/0117485 A1 | 5/2011 | Hermann et al. |
| 2011/0186081 A1 | 8/2011 | Dunn et al. |
| 2012/0041132 A1 | 2/2012 | Monsheimer et al. |
| 2012/0139167 A1 | 6/2012 | Fruth et al. |
| 2012/0201960 A1 | 8/2012 | Hartmann et al. |
| 2012/0202012 A1 | 8/2012 | Grebe et al. |
| 2012/0237870 A1 | 9/2012 | Watanabe et al. |
| 2012/0251689 A1* | 10/2012 | Batchelder .......... A23G 1/0056 426/383 |
| 2012/0263488 A1 | 10/2012 | Aslam et al. |
| 2012/0274002 A1 | 11/2012 | Uchida |
| 2013/0077996 A1 | 3/2013 | Hanson et al. |
| 2013/0077997 A1 | 3/2013 | Hanson et al. |
| 2013/0078013 A1* | 3/2013 | Chillscyzn .......... B29C 67/0074 399/307 |
| 2013/0171434 A1 | 7/2013 | Hirth et al. |
| 2013/0186549 A1* | 7/2013 | Comb ..................... B29C 65/02 156/62.8 |
| 2013/0186558 A1 | 7/2013 | Comb et al. |
| 2014/0004462 A1 | 1/2014 | Zaretsky |
| 2014/0167326 A1 | 6/2014 | Jones et al. |
| 2016/0263828 A1* | 9/2016 | Ederer ............... B29C 67/0081 |
| 2017/0173695 A1* | 6/2017 | Myerberg ............... B22F 3/115 |
| 2017/0182560 A1* | 6/2017 | Myerberg ................. B22F 3/24 |

FOREIGN PATENT DOCUMENTS

| | | |
|---|---|---|
| GB | 2446386 A | 8/2008 |
| JP | 5165350 A | 7/1993 |
| JP | 8281808 A | 10/1996 |
| JP | 10-207194 | 8/1998 |
| JP | 2001075376 A | 3/2001 |
| JP | 2002347129 A | 12/2002 |
| JP | 2003053849 A | 2/2003 |
| JP | 2003071940 A | 3/2003 |
| JP | 2005062860 A | 3/2005 |
| JP | 2006182813 A | 7/2006 |
| WO | 9851464 | 11/1998 |
| WO | 9851464 A1 | 11/1998 |
| WO | 2004037469 A1 | 5/2004 |
| WO | 2007114895 A2 | 10/2007 |
| WO | 2011065920 A1 | 6/2011 |
| WO | 2012034666 A1 | 3/2012 |
| WO | 2013044047 A1 | 3/2013 |

OTHER PUBLICATIONS

"Xerography", Aug. 27, 2010, pp. 1-4, http:/en.wikipedia.org/wiki/Xerography.

Jones, Jason, "Selective Laser Printing", Published Prior to Jan. 14, 2013, 1 page.

DuPont Kapton Technical Information. http://www.dupont.com/content/dam/assets/products-and-services/membranes-films/assets/DEC-Kapton-summary-of-properties.pdf. Date of Publication Unknown.

DuPont Teflon PTFE Properties Handbook. http://www.rjchase.com/ptfe_handbook.pdf. Date of Publication Unknown.

International Search Report and Written Opinion dated Jan. 30, 2013 from International Patent Application No. PCT/US2012/056599, filed Sep. 21, 2012.

USPTO Scientific & Technical Information Center Full Translation of Yamada, JP 10-207194 A. Aug. 2016.

USPTO Scientific & Technical Information Center Full Translation of Nishida, JP 2002-0347129 A. Aug. 2016.

USPTO Scientific & Technical Information Center Full Translation of Koseko, JP 08-0281808 A. Aug. 2016.

Korean Office Action dated Aug. 26, 2017, for corresponding Korean Application No. 10-2016-7028762, filed Oct. 14, 2016.

Japanese Office Action dated Sep. 26, 2017 for correspondence Japanese Application No. 2016-555822, filed Sep. 6, 2016.

* cited by examiner

ELECTROPHOTOGRAPHY-BASED ADDITIVE MANUFACTURING WITH PRE-SINTERING

BACKGROUND

The present disclosure relates to additive manufacturing systems and processes for printing three-dimensional (3D) parts and support structures. In particular, the present disclosure relates to additive manufacturing systems and processes for building 3D parts and support structures using an imaging process, such as electrophotography.

Additive manufacturing systems (e.g., 3D printers) are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part or model may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed, and in some cases, for the sidewalls of the 3D part being formed. The support material adheres to the part material during fabrication, and is removable from the completed 3D part when the printing process is complete.

In two-dimensional (2D) printing, electrophotography (i.e., xerography) is a technology for creating 2D images on planar substrates, such as printing paper and transparent substrates. Electrophotography systems typically include a conductive support drum coated with a photoconductive material layer, where latent electrostatic images are formed by electrostatic charging, followed by image-wise exposure of the photoconductive layer by an optical source. The latent electrostatic images are then moved to a developing station where toner is applied to charged areas, or alternatively to discharged areas of the photoconductive insulator to form visible images. The formed toner images are then transferred to substrates (e.g., printing paper) and affixed to the substrates with heat and/or pressure.

SUMMARY

An aspect of the present disclosure is directed to an additive manufacturing system for printing a 3D part. The system includes one or more electrophotography engines configured to develop the layers of the 3D part from a part material, and a transfer assembly configured to receive the developed layers from the one or more electrophotography engines. The system also includes a pre-sintering heater configured to sinter the developed layers at the transfer assembly to provide sintered contiguous films, a build platform, and a pressing element (e.g., a nip roller) configured to engage with the transfer assembly to press the sintered contiguous films into contact with an intermediate build surface of the 3D part on the build platform in a layer-by-layer manner. The pre-sintering heater is preferably located upstream along the transfer assembly from the pressing element such that the sintered contiguous films cool down to a transfer temperature prior reaching the pressing element.

Another aspect of the present disclosure is directed to an additive manufacturing system for printing a 3D part, where the system includes one or more electrophotography engines configured to develop a layer of the three-dimensional part from a part material comprising an acrylonitrile-butadiene-styrene copolymer, and a transfer belt configured to receive the developed layer from the one or more electrophotography engines. The system also includes a pre-sintering heater configured to sinter the developed layer on the transfer belt to provide sintered contiguous films, and a nip roller engaged with the transfer belt at a location downstream from the pre-sintering heater such that the sintered contiguous film cools down to a temperature ranging from about 100° C. to about 130° C. prior reaching the nip roller.

The nip roller is configured to press the sintered contiguous film into contact with a previously-formed layer of the 3D part with a low applied pressure (e.g., less than 30 pounds-per-square-inch). In some embodiments, the applied pressure is less than 10 pounds-per-square-inch, or even less than 5 pounds-per-square-inch.

Another aspect of the present disclosure is directed to method for printing a 3D part, which includes producing a developed layer of a part material with one or more electrophotography engines of an additive manufacturing system, and transferring the developed layer from the one or more electrophotography engines to a transfer assembly of the additive manufacturing system. The method also includes sintering the developed layer at the transfer assembly to produce a sintered contiguous film, cooling the sintered contiguous film down to a transfer temperature, and pressing the cooled sintered contiguous film into contact with a top surface of the 3D part with a low applied pressure (e.g., less than 30 pounds-per-square-inch). In some embodiments, the applied pressure is less than 10 pounds-per-square-inch, or even less than 5 pounds-per-square-inch.

DEFINITIONS

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "polymer" refers to a polymeric material having one or more monomer species, including homopolymers, copolymers, terpolymers, and the like.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

Figure 1:
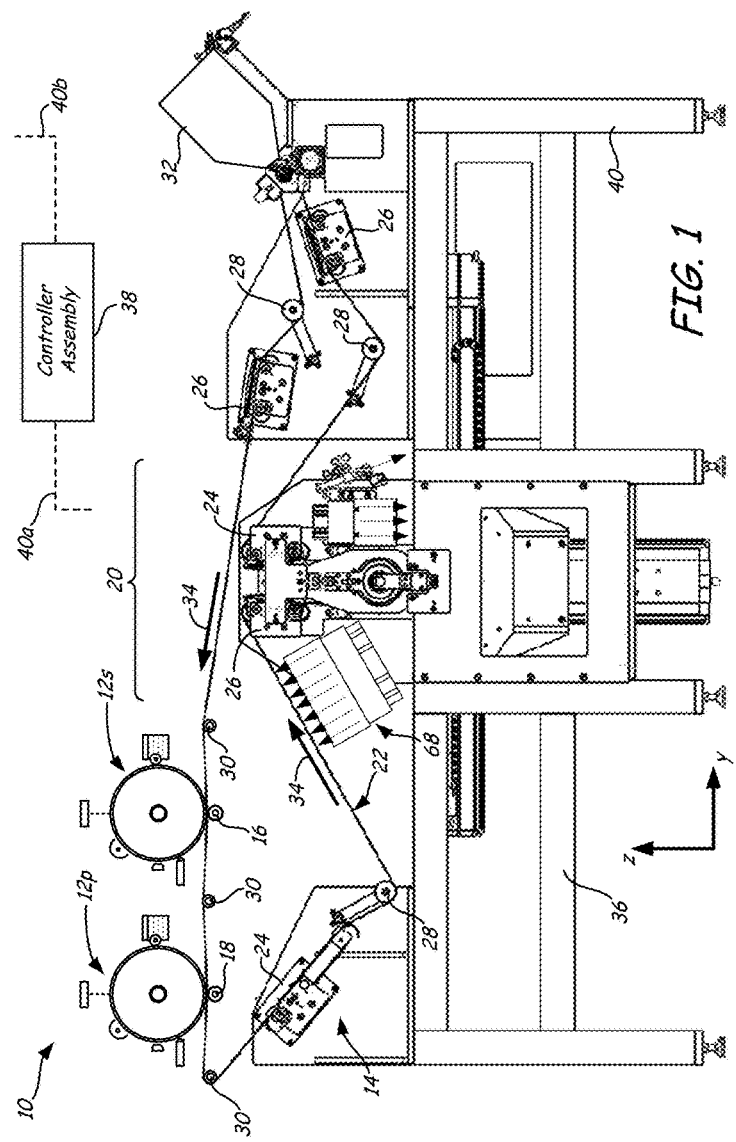
FIG. 1 is a front view of an example electrophotography-based additive manufacturing system for printing 3D parts and support structures with the use of a pre-sintering step.

The present disclosure is directed to a system and process for printing 3D parts and support structures in a layer-by-layer manner using an electrophotography-based additive manufacturing technique, which includes a pre-sintering step. During an electrophotography printing operation, one or more electrophotography (EP) engines may develop or otherwise image each layer of powder-based thermoplastic materials (e.g., part and support materials) using an electrophotographic process. The developed layers are then carried from the EP engines by a transfer medium (e.g., a rotatable belt or drum) to a layer transfusion assembly, where they are transfused (e.g., using heat and/or pressure) to print one or more 3D parts and support structures in a layer-by-layer manner.

As discussed in Hanson et al., U.S. Publication Nos. 2013/0077996 and 2013/0077997, and in Comb et al., U.S. Publication Nos. 2013/0186549 and 2013/0186558, layer transfusion of powder-based thermoplastic materials is a function of time, temperature, and pressure. As the time duration decreases (e.g., for faster printing speeds), the temperature and/or pressure need to be increased achieve sufficient polymer reptation (interlayer and intralayer reptation). However, balancing these factors can be difficult to control since the layer transfusion process is a combination of making intimate mutual contact between the powder particles within a developed layer, making intimate interfacial contact between the developed layer and the top surface of the 3D part, the rate of polymer reptation within the developed layer, and the rate of polymer reptation between the developed layer and the 3D part.

Some techniques focus on using applied pressure as the dominant factor in achieving good polymer reptation, where the developed layer and 3D part are heated and pressed together. The intent was to achieve sufficient polymer reptation during the pressing step by heating the developed layer to a high temperature for a very short duration, and then press the heated layer for a short duration. The applied pressure is intended to deform the powder particles into a closely-packed mass, and the heating is intended to be sufficient to get reptation-based interdiffusion at the interfaces of that close-packed mass.

However, at this high temperature, the applied pressure can undesirably deform or otherwise distort the pressed layer and 3D part due to material flow displacement. This is in addition to other potential issues, such as heating/cooling oscillations required during the transfusion process to maintain a suitable average part temperature.

As such, one conventional solution to this issue is to slow down the printing speed, thereby allowing the temperature and/or the pressure to be decreased to suitable levels. However, as also discussed in the above Hanson and Comb publications, the relationship between the transfusion temperature/pressure and time is an exponential function, such that the printing speed will need to slow down exponentially to achieve a suitable temperature/pressure balance. Accordingly, under this conventional solution, the printing speeds will need to be slowed down by a substantial amount, which can defeat one of the major advantages of electrophotography, which is the potential for fast printing speeds.

To overcome this issue without sacrificing printing speeds, the system and method discussed herein incorporates a pre-sintering step that sinters the powder-based thermoplastic materials into a sintered contiguous film at a high temperature and low (or zero) applied pressure. The term "sintered" refers to a bond in which a modest amount of applied pressure and temperature is sufficient to place the film into intimate contact with a previously-formed layer. In this step, surface tension is believed to be the primary driver in the sintering, where the surface area of the powder is reduced to decrease the available free energy.

This sintered contiguous film is then allowed to cool down to a lower transfer temperature prior to reaching a pressing step. The pressing step may then be performed at this lower transfer temperature with moderately low pressure to overlay the sintered film into intimate contact with the top surface of the 3D part (and any associated support structure). As used herein, the term "intimate contact" refers to a contact that is substantially free of air pockets, and more than 90% of the film area is separated by less than 10 angstroms form the previously-formed layer. Preferably, the bond that is formed from the intimate contact is sufficient to prevent an un-annealed strain the film from pulling the film away from the previously-formed layer before the viscosity of the film allows it to anneal and inter-diffuse over the subsequent 30 minutes.

The 3D part is also preferably held at an elevated temperature, such as a temperature close to, but below the glass transition temperatures of the part material. Therefore, over the duration of the printing operation, the polymers of the sintered film and the 3D part interdiffuse to achieve good polymer reptation (intralayer and interlayer). Because the sintered film and the 3D part are maintained a moderately low temperatures, little or no part deformation occurs, and fast printing speeds may be maintained.

FIGS. 1-4 illustrate system 10, which is an example electrophotography-based additive manufacturing system for printing 3D parts from a part material, and associated support structures from a support material, and incorporates a pre-sintering step, as explained below. As shown in FIG. 1, system 10 includes a pair of EP engines 12p and 12s, belt transfer assembly 14, biasing mechanisms 16 and 18, and layer transfusion assembly 20. Examples of suitable components and functional operations for system 10 include those disclosed in Hanson et al., U.S. Publication Nos. 2013/0077996 and 2013/0077997, and in Comb et al., U.S. Publication Nos. 2013/0186549 and 2013/0186558.

EP engines 12p and 12s are imaging engines for respectively imaging or otherwise developing layers of the part and support materials. As discussed below, the imaged layers may then be transferred to belt transfer assembly 14 (or other transfer medium) with biasing mechanisms 16 and 18, and carried to layer transfusion assembly 20 to print the 3D parts and associated support structures in a layer-by-layer manner.

In the shown embodiment, belt transfer assembly 14 includes transfer belt 22, belt drive mechanisms 24, belt drag mechanisms 26, loop limit sensors 28, idler rollers 30, and belt cleaner 32, which are configured to maintain tension on belt 22 while belt 22 rotates in the rotational direction of arrows 34. In particular, belt drive mechanisms 24 engage and drive belt 22, and belt drag mechanisms 26 may function as brakes to provide a service loop design for protecting belt 22 against tension stress, based on monitored readings via loop limit sensors 28.

The components of system 10 may be retained by one or more frame structures, such as frame 36. Additionally, the components of system 10 are preferably retained within an enclosable housing (not shown) that prevents ambient light from being transmitted to the components of system 10 during operation.

System 10 also includes controller assembly 38, which is one or more computer-based systems configured to operate the components of system 10, and which may be internal or external to system 10. Controller assembly 38 may include any suitable computer-based hardware, such as user interfaces, memory controllers, processors, storage media, input/output controllers, communication adapters, and a variety of additional components that are contained in conventional computers, servers, media devices, and/or printer controllers. For instance, controller assembly 38 may include one or more computer-processing units configured to operate controller assembly 38 and system 10, such as one or more microprocessor-based engine control systems and/or digitally-controlled raster imaging processor systems.

Controller assembly 38 may communicate over communication line 40a with the various components of system 10, such as EP engines 12p and 12s, belt transfer assembly 14, biasing mechanisms 16 and 18, layer transfusion assembly 20, and various sensors, calibration devices, display devices, and/or user input devices. Additionally, controller assembly 38 may also communicate over communication line 40b with external devices, such as other computers and servers over a network connection (e.g., a local area network (LAN) connection). While communication lines 40a and 40b are each illustrated as a single signal line, they may each include one or more electrical, optical, and/or wireless signal lines.

Figure 2:
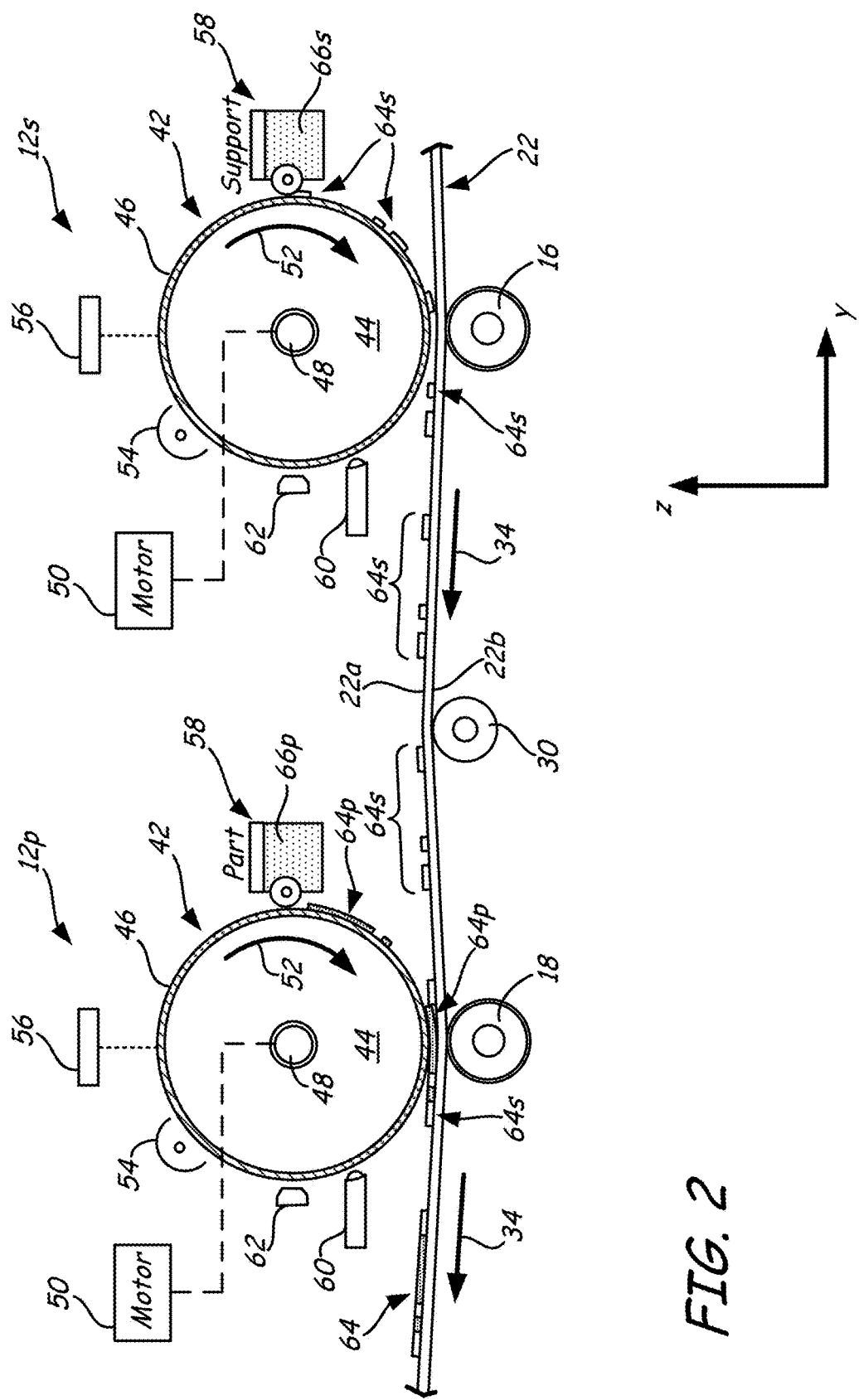
FIG. 2 is a schematic front view of a pair of electrophotography engines of the system for developing layers of the part and support materials.

FIG. 2 illustrates EP engines 12p and 12s, where EP engine 12s (i.e., the upstream EP engine relative to the rotational direction of belt 22) develops layers of the support material, and EP engine 12p (i.e., the downstream EP engine relative to the rotational direction of belt 22) develops layers of the part material. In alternative embodiments, the arrangement of EP engines 12p and 12s may be reversed such that EP engine 12p is upstream from EP engine 12s relative to the rotational direction of belt 22. In further alternative embodiments, system 10 may include three or more EP engines for printing layers of additional materials (e.g., materials of different colors, opacities, and/or functional characteristics).

In the shown embodiment, EP engines 12p and 12s may include the same components, such as photoconductor drum 42 having conductive drum body 44 and photoconductive surface 46. Conductive drum body 44 is an electrically-conductive drum (e.g., fabricated from copper, aluminum, tin, or the like) that is electrically grounded and configured to rotate around shaft 48. Shaft 48 is correspondingly connected to drive motor 50, which is configured to rotate shaft 48 (and photoconductor drum 42) in the direction of arrow 52 at a constant rate.

Photoconductive surface 46 is a thin film extending around the circumferential surface of conductive drum body 44, and is preferably derived from one or more photoconductive materials, such as amorphous silicon, selenium, zinc oxide, organic materials, and the like. As discussed below, surface 46 is configured to receive latent-charged images of the sliced layers of the 3D part or support structure (or negative images), and to attract charged particles of the part or support material of the present disclosure to the charged or discharged image areas, thereby creating the layers of the 3D part or support structure.

As further shown, EP engines 12p and 12s also includes charge inducer 54, imager 56, development station 58, cleaning station 60, and discharge device 62, each of which may be in signal communication with controller assembly 38 over communication line 40a. Charge inducer 54, imager 56, development station 58, cleaning station 60, and discharge device 62 accordingly define an image-forming assembly for surface 46 while drive motor 50 and shaft 48 rotate photoconductor drum 42 in the direction of arrow 52.

In the shown example, the image-forming assembly for surface 46 of EP engine 12s is used to form layers 64s of the support material (referred to as support material 66s), where a supply of support material 66s may be retained by development station 58 (of EP engine 12s) along with carrier particles. Similarly, the image-forming assembly for surface 46 of EP engine 12p is used to form layers 64p of the part material (referred to as part material 66p), where a supply of part material 66p may be retained by development station 58 (of EP engine 12p) along with carrier particles.

Charge inducer 54 is configured to generate a uniform electrostatic charge on surface 46 as surface 46 rotates in the direction of arrow 52 past charge inducer 54. Suitable devices for charge inducer 54 include corotrons, scorotrons, charging rollers, and other electrostatic charging devices.

Imager 56 is a digitally-controlled, pixel-wise light exposure apparatus configured to selectively emit electromagnetic radiation toward the uniform electrostatic charge on surface 46 as surface 46 rotates in the direction of arrow 52 past imager 56. The selective exposure of the electromagnetic radiation to surface 46 causes discrete pixel-wise locations of the electrostatic charge to be removed (i.e., discharged to ground), thereby forming latent image charge patterns on surface 46.

Suitable devices for imager 56 include scanning laser (e.g., gas or solid state lasers) light sources, light emitting diode (LED) array exposure devices, and other exposure device conventionally used in 2D electrophotography systems. In alternative embodiments, suitable devices for charge inducer 54 and imager 56 include ion-deposition systems configured to selectively directly deposit charged ions or electrons to surface 46 to form the latent image charge pattern. As such, as used herein, the term "electrophotography" includes ionography.

Each development station 58 is an electrostatic and magnetic development station or cartridge that retains the supply of part material 66p or support material 66s, preferably in powder form, along with carrier particles. Development stations 58 may function in a similar manner to single or dual component development systems and toner cartridges used in 2D electrophotography systems. For example, each development station 58 may include an enclosure for retaining the part material 66p or support material 66s and carrier particles. When agitated, the carrier particles generate triboelectric charges to attract the powders of the part material 66p or support material 66s, which charges the attracted powders to a desired sign and magnitude.

Each development station 58 may also include one or more devices for transferring the charged part material 66p or support material 66s to surface 46, such as conveyors, fur brushes, paddle wheels, rollers, and/or magnetic brushes. For instance, as surface 46 (containing the latent charged image) rotates from imager 56 to development station 58 in the direction of arrow 52, the charged part material 66p or support material 66s is attracted to the appropriately charged regions of the latent image on surface 46, utilizing either charged area development or discharged area development (depending on the electrophotography mode being utilized).

This creates successive layers 64p or 64s as photoconductor drum 12 continues to rotate in the direction of arrow 52, where the successive layers 64p or 64s correspond to the successive sliced layers of the digital representation of the 3D part or support structure. After being developed, the successive layers 64p or 64s are then rotated with surface 46 in the direction of arrow 52 to a transfer region in which layers 64p or 64s are successively transferred from photoconductor drum 42 to belt 22. While illustrated as a direct engagement between photoconductor drum 42 and belt 22, in some preferred embodiments, EP engines 12p and 12s may also include intermediary transfer drums and/or belts, as discussed further below in FIG. 3.

After a given layer 64p or 64s is transferred from photoconductor drum 42 to belt 22 (or an intermediary transfer drum or belt), drive motor 50 and shaft 48 continue to rotate photoconductor drum 42 in the direction of arrow 52 such that the region of surface 46 that previously held the layer 64p or 64s passes cleaning station 60. Cleaning station 60 is a station configured to remove any residual, non-transferred portions of part or support material 66p or 66s. Suitable devices for cleaning station 60 include blade cleaners, brush cleaners, electrostatic cleaners, vacuum-based cleaners, and combinations thereof.

After passing cleaning station 60, surface 46 continues to rotate in the direction of arrow 52 such that the cleaned regions of surface 46 pass discharge device 62 to remove any residual electrostatic charge on surface 46, prior to starting the next cycle. Suitable devices for discharge device 62 include optical systems, high-voltage alternating-current corotrons and/or scorotrons, one or more rotating dielectric rollers having conductive cores with applied high-voltage alternating-current, and combinations thereof.

Transfer belt 22 is a transfer medium for transferring the developed successive layers 64p and 64s from photoconductor drum 42 (or an intermediary transfer drum or belt) to layer transfusion assembly 20. Examples of suitable transfer belts for belt 22 include those disclosed in Comb et al., U.S. Publication Nos. 2013/0186549 and 2013/0186558. Belt 22 includes front surface 22a and rear surface 22b, where front surface 22a faces surfaces 46 of photoconductor drums 42 and rear surface 22b is in contact with biasing mechanisms 16 and 18.

Biasing mechanisms 16 and 18 are configured to induce electrical potentials through belt 22 to electrostatically attract layers 64p and 64s from EP engines 12p and 12s to belt 22. Because layers 64p and 64s are each only a single layer increment in thickness at this point in the process, electrostatic attraction is suitable for transferring layers 64p and 64s from EP engines 12p and 12s to belt 22.

Controller assembly 38 preferably rotates photoconductor drums 42 of EP engines 12p and 12s at the same rotational rates that are synchronized with the line speed of belt 22 and/or with any intermediary transfer drums or belts. This allows system 10 to develop and transfer layers 64p and 66s in coordination with each other from separate developer images. In particular, as shown, each part layer 64p may be transferred to belt 22 with proper registration with each support layer 64s to preferably produce a combined or composite part and support material layer 64.

This allows layers 64p and 64s to be transfused together, requiring the part and support materials to have thermal properties and melt rheologies that are similar or substantially the same. As can be appreciated, some layers transferred to layer transfusion assembly 20 may only include support material 66s or may only include part material 66p.

In an alternative embodiment, part layers 64p and support layers 64s may optionally be developed and transferred along belt 22 separately, such as with alternating layers 64p and 64s. These successive, alternating layers 64p and 64s may then be transferred to layer transfusion assembly 20, where they may be transfused separately to print the 3D part and support structure.

Figure 3:
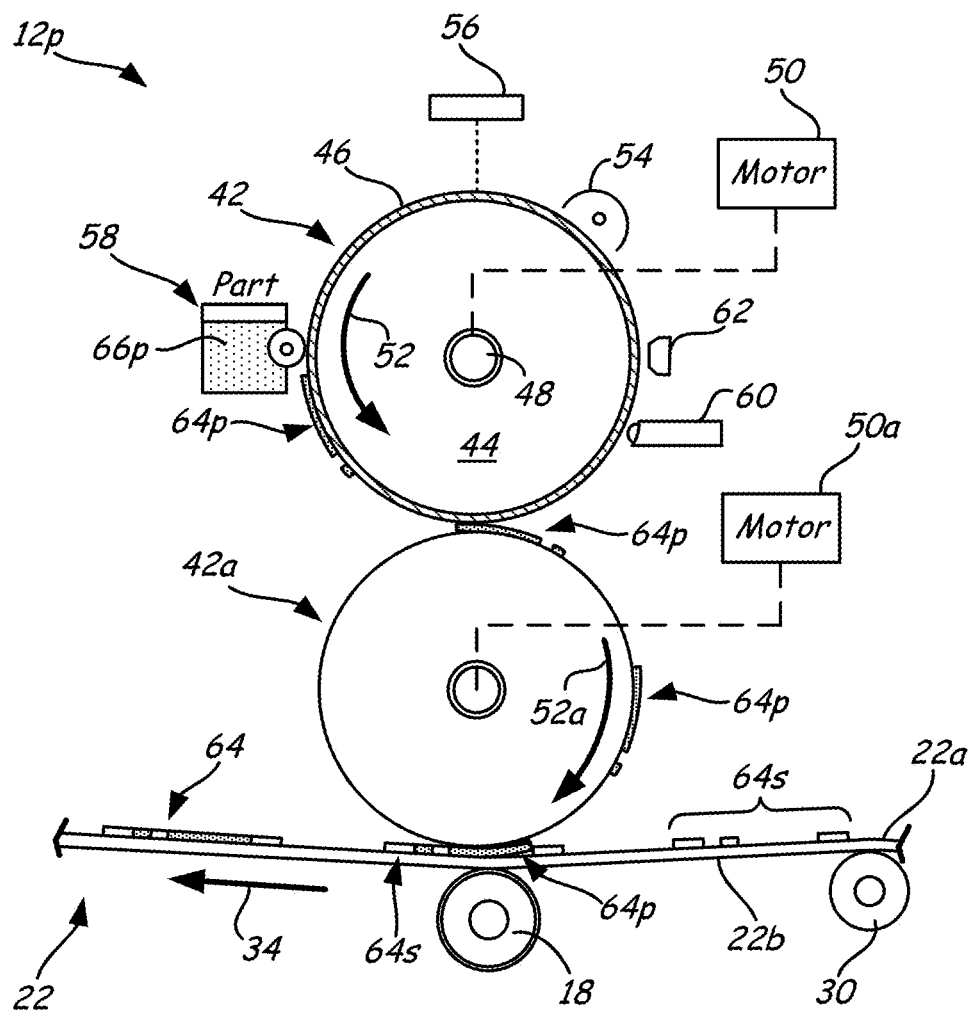
FIG. 3 is a schematic front view of an alternative electrophotography engine, which includes an intermediary drum or belt.

In some embodiments, one or both of EP engines 12p and 12s may also include one or more intermediary transfer drums and/or belts between photoconductor drum 42 and belt 22. For example, as shown in FIG. 3, EP engine 12p may also include intermediary drum 42a that rotates an opposing rotational direction from arrow 52, as illustrated by arrow 52a, under the rotational power of motor 50a.

Intermediary drum 42a engages with photoconductor drum 42 to receive the developed layers 64p from photoconductor drum 42, and then carries the received developed layers 64p and transfers them to belt 22.

EP engine 12s may include the same arrangement of intermediary drum 42a for carrying the developed layers 64s from photoconductor drum 42 to belt 22. The use of such intermediary transfer drums or belts for EP engines 12p and 12s can be beneficial for thermally isolating photoconductor drum 42 from belt 22, if desired.

Figure 4:
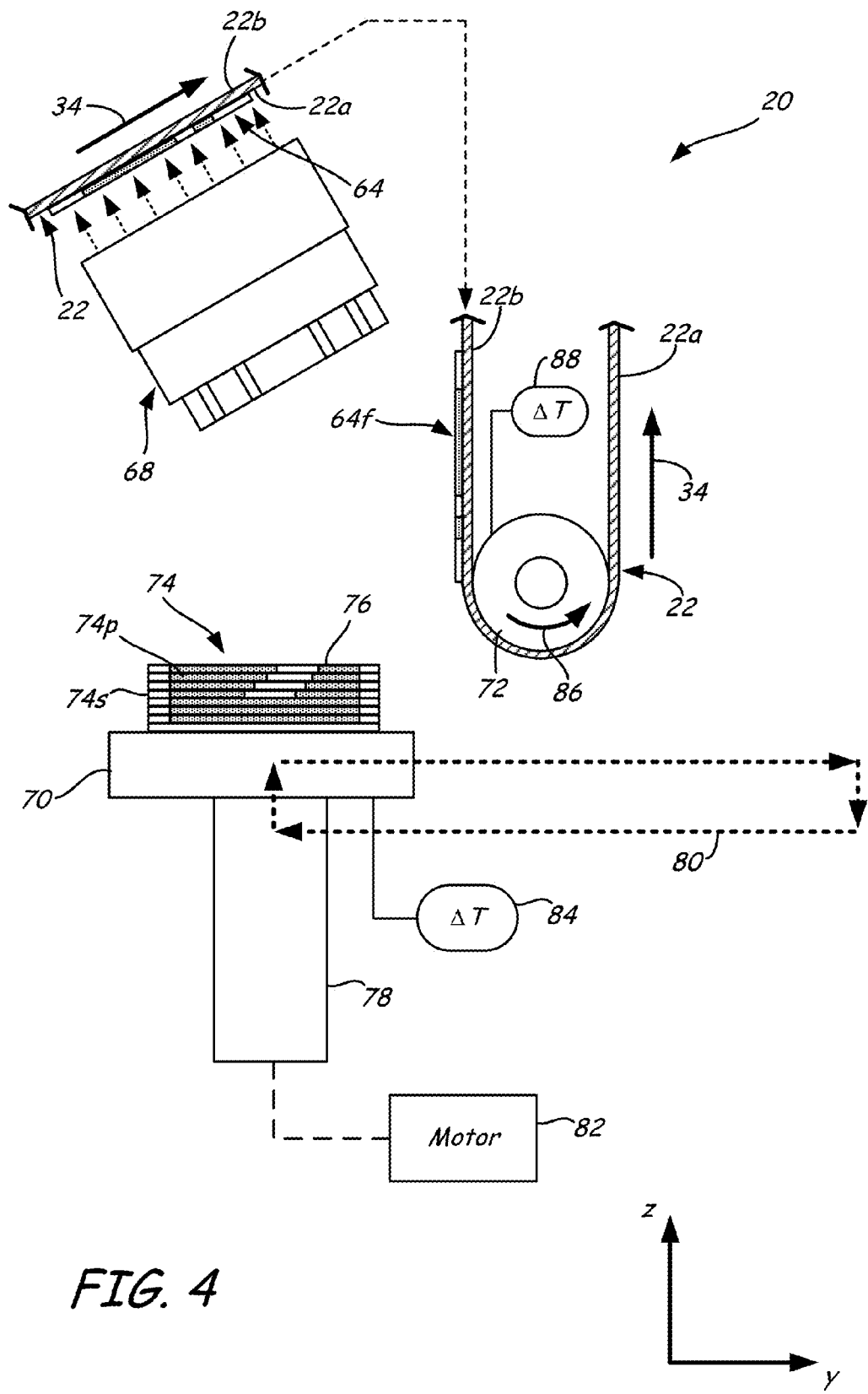
FIG. 4 is a schematic front view of a layer transfusion assembly of the system for performing pre-sintering and pressing steps.

FIG. 4 illustrates an example embodiment for layer transfusion assembly 20. As shown, layer transfusion assembly 20 includes pre-sintering heater 68, build platform 70, and nip roller 72. In alternative embodiments, layer transfusion assembly 20 may also optionally include one or more post-fuse heaters and air jets (or other cooling units), and/or other arrangements (e.g., press plates, multiple rollers, etc....) as described in Comb et al., U.S. Publication Nos. 2013/0186549 and 2013/0186558.

Pre-sintering heater 68 (also depicted above in FIG. 1) is one or more heating devices (e.g., an infrared heater, a heated air jet, and/or a contact roller) configured to sinter the powder-based materials of layers 64 prior to reaching nip roller 72. Each layer 64 desirably passes by (or through) pre-sintering heater 68 for a sufficient residence time to heat the layer 64, thereby sintering the powder-based material into a sintered contiguous film 64f. As also discussed below, pre-sintering heater 68 is preferably located upstream from nip roller 72 by a sufficient distance to allows the sintered film 64f to partially cool down prior to a desired transfer temperature before reaching nip roller 72.

Build platform 70 is a platform assembly or platen of system 10 that is configured to receive the sintered film 64f for printing a 3D part and any associated support structure, referred to as 3D part 74p and support structure 74s, in a layer-by-layer manner. For ease of discussion, 3D part 74p and support structure 74s are herein referred to collectively as 3D part 74 having an intermediate build surface 76. In some embodiments, build platform 70 may include removable film substrates (not shown) for receiving the sintered layers 64f, where the removable film substrates may be restrained against build platform 70 using any suitable technique (e.g., vacuum drawing, removable adhesive, mechanical fastener, magnetic attraction, and the like).

Build platform 70 is supported by gantry 78, which is a gantry mechanism configured to move build platform 70 along the z-axis and the y-axis, preferably to produce a reciprocating rectangular pattern, where the primary motion is back-and-forth along the y-axis (illustrated by broken lines 80). While the reciprocating rectangular pattern is described as a rectangular pattern with sharp axial corners (defined by arrows 80), gantry 78 may move build platform 70 in a reciprocating rectangular pattern having rounded or oval-defining corners, so long as build platform 70 moves along the y-axis during the pressing steps. Gantry 78 may be operated by motor 82 based on commands from controller assembly 38, where motor 82 may be an electrical motor, a hydraulic system, a pneumatic system, or the like.

In the shown embodiment, build platform 70 is heatable with heating element 84 (e.g., an electric heater). Heating element 84 is configured to heat and maintain build platform 70 at an elevated temperature that is greater than room temperature (25° C.), and more preferably at about the glass transition temperature of the part material, or closely below the glass transition temperature, such as within about 15° C., about 10° C., or even about 5° C. below the glass transition temperature.

Nip roller 72 is an example heatable pressing element, which is configured to rotate around a fixed axis with the movement of belt 22. In particular, nip roller 72 may roll against rear surface 22b in the direction of arrow 86 while belt 22 rotates in the direction of arrow 34. In the shown embodiment, nip roller 72 is heatable with heating element 88 (e.g., an electric heater). Heating element 88 is configured to heat and maintain nip roller 72 at an elevated temperature that is greater than room temperature (25° C.), such as at substantially the same temperature as build platform 70 (e.g., at about the glass transition temperature of the part material, or closely below the glass transition temperature, such as within about 15° C., about 10° C., or even about 5° C. below the glass transition temperature).

During the printing operation, belt 22 carries a developed layer 64 of the powder-based, thermoplastic part and/or support materials past pre-sintering heater 68. Pre-sintering heater 68 accordingly sinters the powder-based materials at a high temperature and low (or zero) applied pressure.

The particular temperature for sintering the powder-based material of layer 64 may vary depending on the thermoplastic properties of the powder-based material. As mentioned above, surface tension is believed to be the primary driver in the sintering, where the surface area of the powder particles is reduced to decrease the available free energy. This can be described by the Frenkel model of viscous sintering for the rate of coalescence of spherical adjacent particles, as described in Equation 1:

$$\frac{x^2}{R} = \frac{2}{3}\frac{\Gamma}{\eta}t \quad \text{(Equation 1)}$$

Equation 1 is subject to the limitation of x/R<0.3, where x is the neck radius, R is the radius of the particles, $\Gamma$ is the surface tension, and $\eta$ is the viscosity, and t is the sintering time. While Equation 1 has been successfully applied to glass and ceramic materials, for polymeric materials, Equation 2 provides a more accurate model:

$$\left(\frac{x^2}{R^{1.02}}\right)^p = F(T)t \quad \text{(Equation 2)}$$

where F(T) is a function only of the temperature. For the parameter p=1, this reduces to the Frenkel model of Equation 1. Equation 2 also assumes the melt to be non-Newtonian and to follow the Power Law constitutive equation, which provides the expression shown in Equation 3:

$$\left(\frac{x^2}{R}\right)^{1/n} = \frac{t}{2n}\left(\frac{8n\Gamma}{m}\right)^{1/n} \quad \text{(Equation 3)}$$

where n and m are the Power Law model constants.

Thus, the parameter p in Equation 2 acquires a rheological meaning. For n=1, the above equation reduces to a corrected form of Equation 1. However, the flow field during the coalescence process is typically not homogeneous or isothermal. Therefore, the coalescence stage is dependent on the kinematics of the flow field taking viscoelastic effects into account.

The coalescence stage is usually considered terminal when x/R reaches a value of 0.5. For the densification stage that follows, Equation 4 may apply:

$$\frac{r}{r_0} = 1 - \frac{\Gamma}{2\eta r_0} t \qquad \text{(Equation 4)}$$

where $r_0$ is the initial radius of the approximately spherical cavity or pore size after initial coalescence (e.g., about 3 micrometers), and r is the radius at time t. The densification stage therefore has a time constant $\tau_{dense}$ as expressed in Equation 5:

$$\tau_{dense} = \frac{2\eta r_0}{\Gamma} \qquad \text{(Equaiton 5)}$$

Based on assumptions of Newtonian necking time, and that the transition from necking to densification occurs when the necking diameter is 0.3 times the particle diameter, then the densification time is about two times the necking time. Therefore, the necking and densification may be combined to get a sintering time $\tau$ as expressed in Equation 6:

$$\tau = \frac{3\eta r_0}{\Gamma} \qquad \text{(Equation 6)}$$

Figure 5:
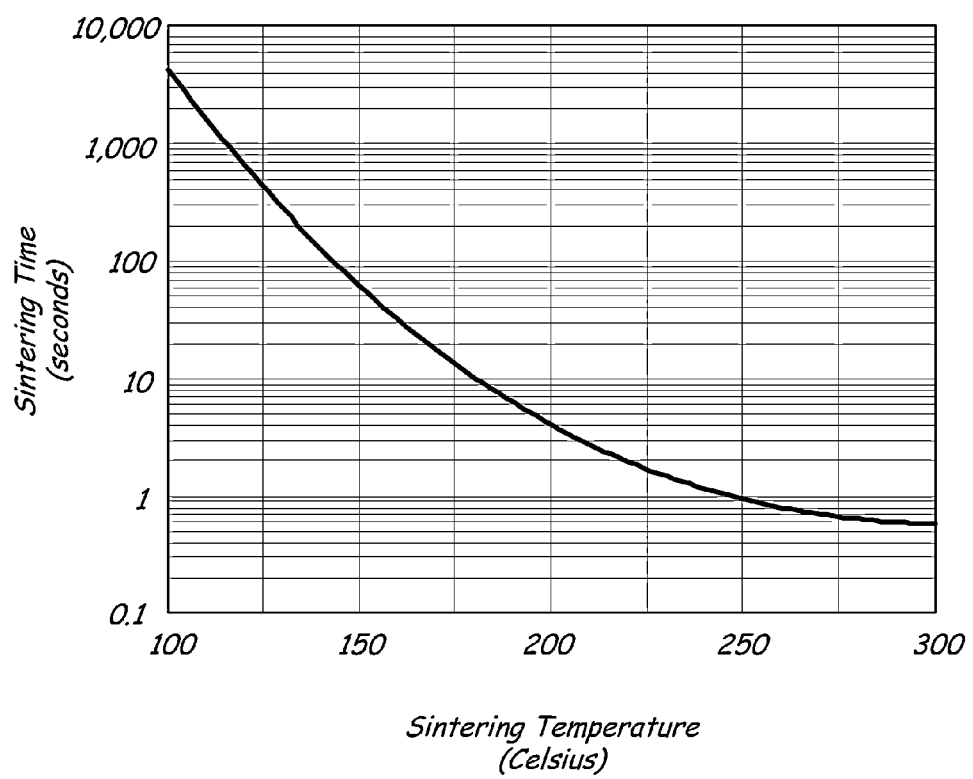
FIG. 5 is a graphical plot of sintering time versus sintering temperature for an example acrylonitrile-butadiene-styrene (ABS) material.

For example, with these values, the sintering time as a function of temperature for 12-micrometer acrylonitrile-butadiene-styrene (ABS) particles with no applied pressure are illustrated in FIG. 5. For instance, if the ABS particles are heated to about 200° C., the pre-sintering step will require at least about three seconds to sinter the layer 64 into a sintered contiguous film 64f when no pressure is applied. If belt 22 is moving with a line speed of about 8 inches/second, this requires pre-sintering heater 68 to have a length of about 24 inches when no pressure is applied (e.g., for non-contact heating, such as infrared heating). Accordingly, with these parameters and a powder-based ABS copolymer part material, pre-sintering heater 68 may heat layer 64 from about 180° C. to about 220° C. when no pressure is applied, for example.

The continued rotation of belt 22 then carries the sintered film 64f to nip roller 72. While travelling between pre-sintering heater 68 and nip roller 72, sintered film 64f preferably cools down to a lower transfer temperature prior to reaching nip roller 72, preferably by passive cooling, but active cooling (e.g., cooling air) may optionally be used. This allows sintered film 64f to withstand the nip pressure of nip roller 72 during the subsequent pressing step without deforming.

Accordingly, pre-sintering heater 68 is preferably located upstream from nip roller 72 by a sufficient distance in the movement direction of belt 22 to provide sufficient time for sintered layer 64f to cool down to the desired transfer temperature. The particular transfer temperature will also depend on the part material used. For instance, for a powder-based ABS part material, preferred transfer temperatures range from about 100° C. to about 130° C., more preferably from about 105° C. to about 125° C., and even more preferably from about 110° C. to about 120° C.

Along with the rotation of belt 22, gantry 78 may move build platform 70 to align the top surface of 3D part 74 with the incoming sintered film 64f on belt 22, preferably with proper overlay in the x-y plane. Gantry 78 may continue to move build platform 70 along the y-axis, at a rate that is synchronized with the rotational rate of belt 22 in the direction of arrow 34 (i.e., the same directions and speed). This causes rear surface 22b of belt 22 to rotate around nip roller 72 to nip belt 22 and the sintered film 64f against the build surface 76 of 3D part 74.

This accordingly presses the sintered film 64f between build surface 76 of 3D part 74 at the location of nip roller 72 to press the sintered film 64f into intimate contact with build surface 76. Examples of suitable pressures for this pressing step (for use in combination with the pre-sintering step) include pressures less than about 30 pounds-per-square-inch (psi), more preferably less than 20 psi, even more preferably less than 15 psi. In some preferred embodiments, the pressures for this pressing step is less than 10 psi, and even more preferably less than 5 psi.

As the sintered layer 64f passes the nip of nip roller 72, belt 22 wraps around nip roller 72 to separate and disengage from build platform 70. This assists in releasing the sintered layer 64f from belt 22, allowing the sintered layer 64f to remain adhered to 3D part 74.

Gantry 78 may then actuate build platform 70 downward, and move build platform 70 back along the y-axis to a starting position along the y-axis, following the reciprocating rectangular pattern 80. Build platform 70 desirably reaches the starting position for proper registration with the next sintered layer 74. In some embodiments, gantry 78 may also actuate build platform 70 and 3D part 74 upward for proper overlay with the next sintered layer 64f. The same process may then be repeated for each remaining sintered layer 64f.

Figure 6:
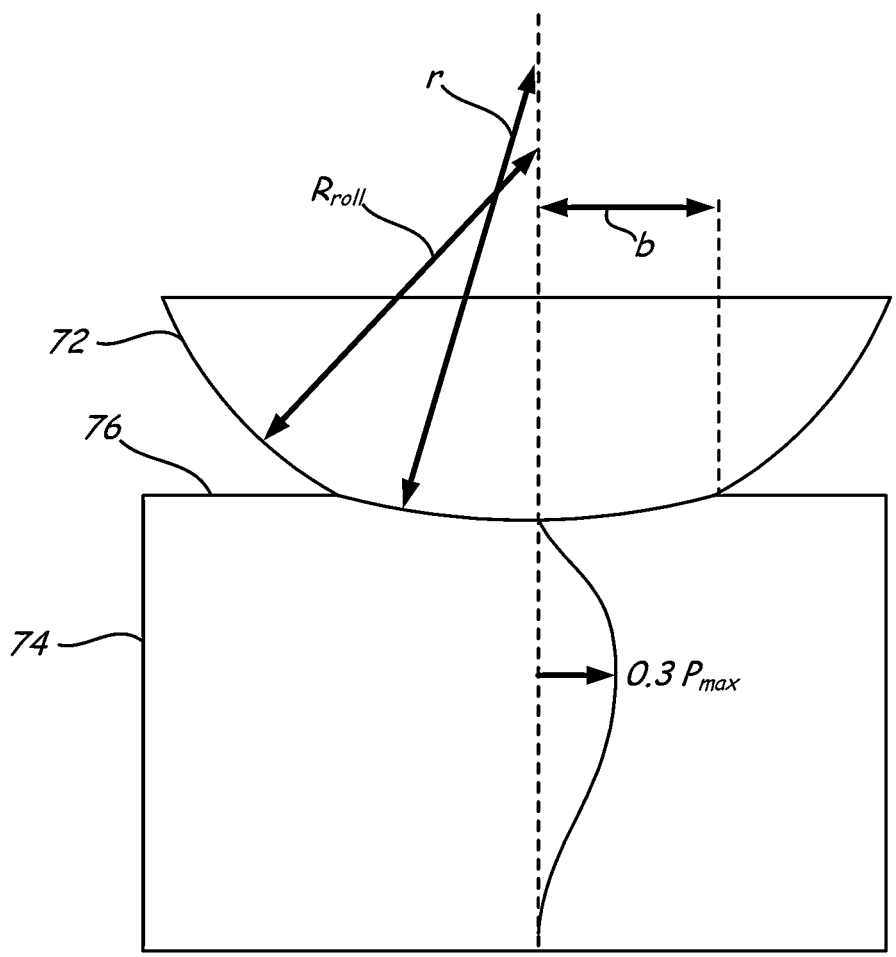
FIGS. 6 and 7 are schematic illustrations of a nip roller of the layer transfusion assembly pressed against a top surface of a 3D part, illustrating distortion effects on the 3D part under the applied pressure.

As mentioned above, nip roller 72 preferably presses the sintered film 64f into intimate contact with build surface 76, preferably with a low applied pressure (e.g., 2 psi). This reduces the risk of displacing the internal geometries of 3D part 74 from their predetermined positions, and may be modeled as a viscous flow around a cylinder. The general solution of viscous flow around a cylinder may be based on a standard Hertzian contact between a cylinder and a plane, as illustrated in FIG. 6. In this case, half width of the contact nip roller 72 may be represented by Equation 7:

$$b = \sqrt{\frac{4FR_{roll}\left[\frac{1-v_{part}^2}{E_{part}} + \frac{1-v_{roll}^2}{E_{roll}}\right]}{\pi L}} \qquad \text{(Equation 7)}$$

where $E_{ABS}$ and $E_{roll}$ are the moduli of elasticity for 3D part 76 and nip roller 72; $v_{part}$ and $v_{roll}$ are the Poisson's ratios of 3D part 76 and nip roller 72; L is the contact length; and F is the force applied.

Furthermore, the maximum contact pressure may be represented by Equation 8:

$$p_{max} = \frac{2F}{\pi b L} \qquad \text{(Equation 8)}$$

Accordingly, the lateral shear (attempting to force part material from under the contact in along the y-axis) peaks about b below the contact, as described in Equations 9-11:

$$\tau_1 = \left|\frac{\sigma_2 - \sigma_3}{2}\right| \qquad \text{(Equation 9)}$$

$$\sigma_2 = -p_{max}\left[\left(2-\left(\frac{z^2}{b^2}+1\right)^{-1}\right)\sqrt{\frac{z^2}{b^2}+1}-2\left|\frac{z}{b}\right|\right] \quad \text{(Equation 10)}$$

$$\sigma_3 = -p_{max}\left[\sqrt{\frac{z^2}{b^2}+1}\right]^{-1} \quad \text{(Equation 11)}$$

If, for example, the total length of nip roller 72 in the y-axis print direction is 0.4 inches, and the average applied pressure is 15 psi, the lateral shear stress peaks about 0.16 inches below the nip with a pressure of about 7 psi.

A Hertzian analysis is applicable here because 3D part 74 as formed preferably appears reasonably solid as nip roller 72 rolls by. Otherwise, 3D part 74 will be destructively distorted (i.e., deformed). The above analysis indicates that any viscous distortion will maximally occur about a nip half-width below build surface 76 of 3D part 74, and that the driving pressure will be about half of the average nip pressure.

Figure 7:
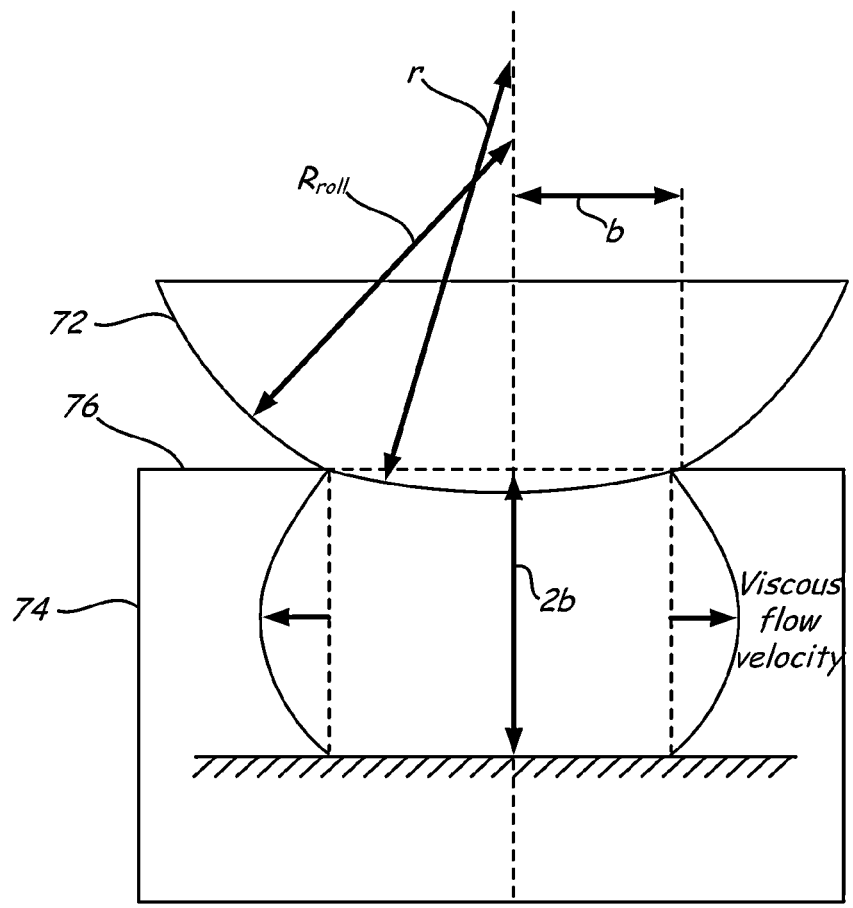

In the case of interest, nip roller 72 is believed to sink into 3D part 74, which provides a source of part material to flow in front of and behind the nip. Based on the Hertzian analysis, this problem can be approximated as a planar viscous flow between two fixed plates spaced a nip length apart, and driven by a constant pressure equal to half of the average nip pressure. This is illustrated in FIG. 7, where the bottom virtual plane is 2b below the top surface of 3D part 74, and the top plane is the build surface 76 of 3D part 74.

The velocity profile for constant pressure driven flow between two plates separated by a distance 2b may be expressed by Equation 12:

$$v_y(z) = \frac{1}{2\eta}\frac{\partial P}{\partial y}(b^2 - (z+b)^2) \quad \text{(Equation 12)}$$

In this case, the maximum spatial motion is dominant, which occurs at z=−b. Furthermore, it is assumed that the driving pressure decays to zero by the time y=b, such that Equation 13 applies:

$$\frac{\partial P}{\partial y} = \frac{P_{ave}}{2b} \quad \text{(Equation 13)}$$

Moreover, assuming a belt 22 velocity of $v_{belt}$, the integral of the velocity over the time it takes nip roller 72 to move from when the distorting flow starts (when a point is below the leading edge of the nip) to when it stops (when that point is below the center of the nip) may be expressed by Equation 14:

$$y_{dist} = \frac{b^2}{4\eta}\frac{P_{ave}}{v_{belt}} \quad \text{(Equation 14)}$$

Assuming that the distortion distance has to be less than or equal to a size of a voxel in 3D part 76 (i.e., $d_{voxel} > y_{dist}$), then the maximum allowable average nip pressure $P_{ave}$ as a function of the nip size, belt velocity, part material viscosity η, and voxel size may be expressed by Equation 15:

$$P_{ave} < \frac{4v_{belt}\eta d_{voxel}}{b^2} \quad \text{(Equation 15)}$$

Figure 8:
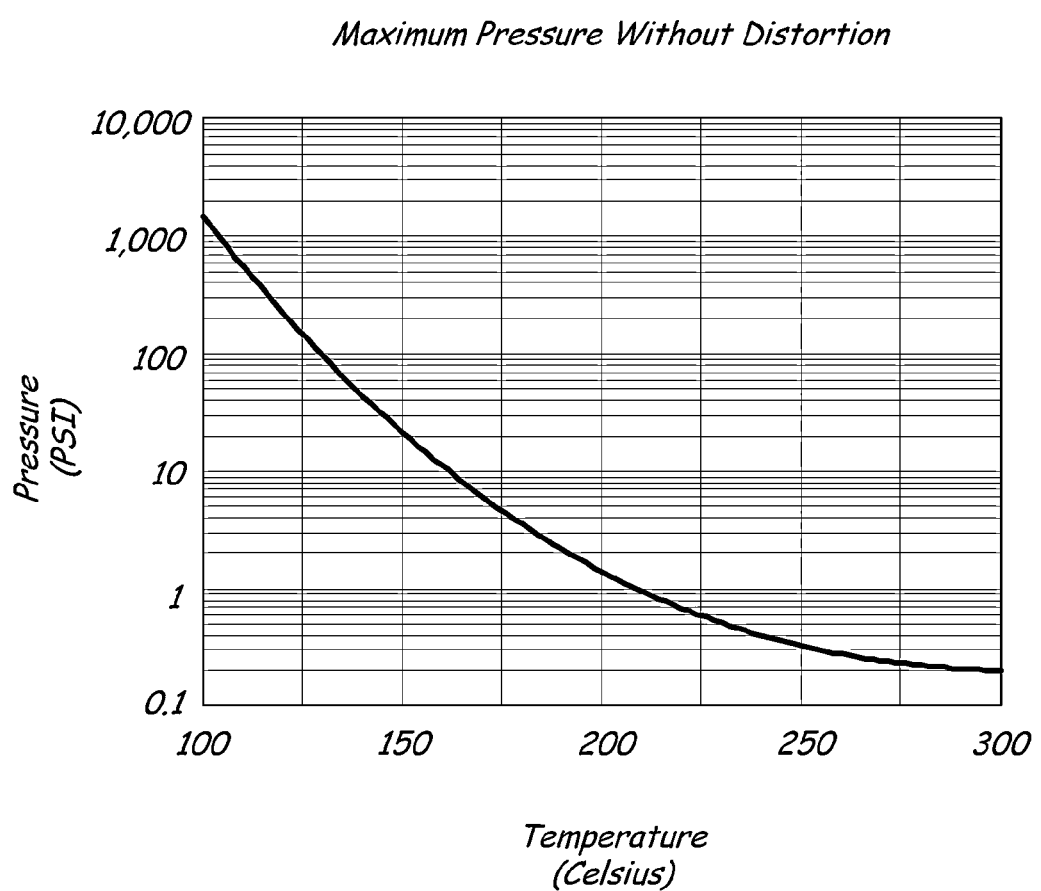
FIG. 8 is a graphical plot of applied pressure versus temperature for the example ABS material, illustrating a maximum pressure without distortion as a function of temperature.

For example, for a ABS part material, 600 dots-per-inch (dpi) voxels, a line speed for belt 22 of 8 inches/second, and nip roller 72 having a nip length of 0.4 inches, the approximate maximum pressure in the nip to not distort 3D part 76 by more than a voxel, as a function of temperature, is described in FIG. 8.

This suggests that 138° C. is the hottest part temperature that might be expected to tolerate an applied nip pressure of 30 psi nip at a line speed of 8 inches/second. If the belt speed is slower, the maximum pressure may be lower and/or the maximum part temperature may be lower.

In another example, if 15 psi is set to be a minimum convenient average nip pressure, the above-discussed relationship can be re-expressed as a maximum allowable dwell time of the nip over a portion of 3D part 76 such that the part does not distort significantly, as described in Equation 16:

$$\tau_{dist} = \frac{b}{v_{belt}} = \frac{4\eta d_{voxel}}{P_{ave}b} \quad \text{(Equation 16)}$$

Figure 9:
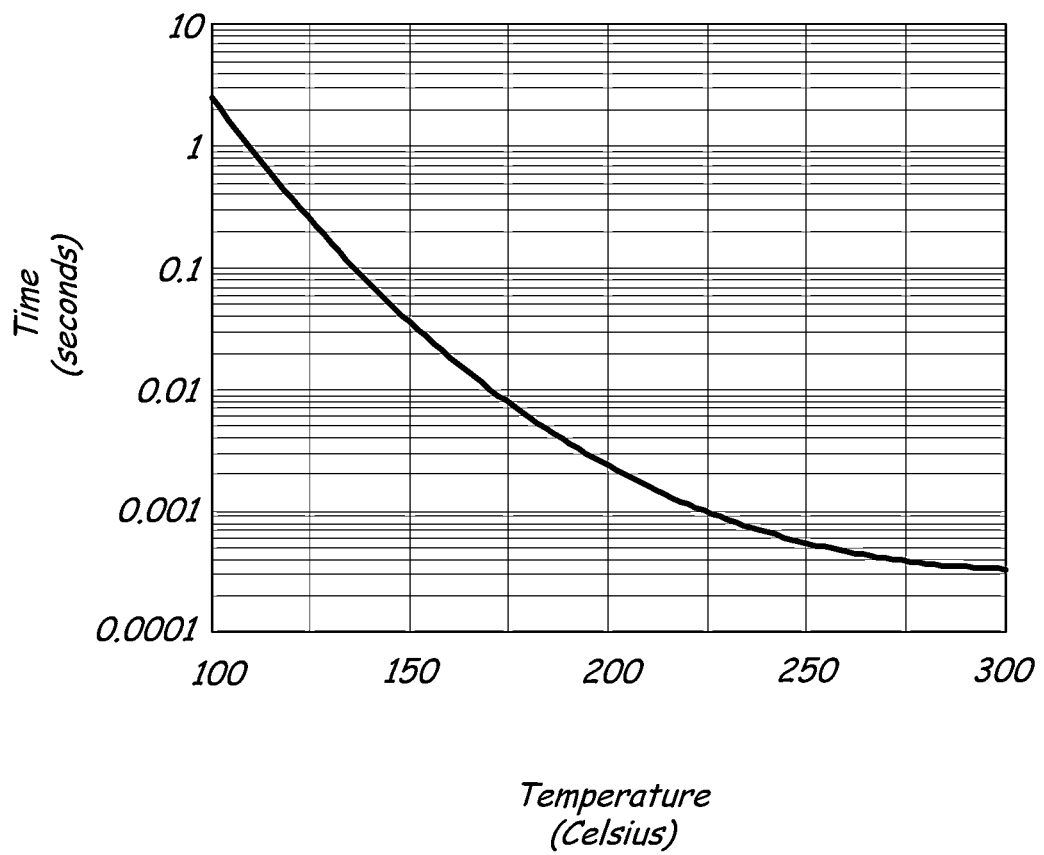
FIG. 9 is a graphical plot of dwell time under the nip roller versus temperature for the example ABS material, illustrating a maximum dwell time at without distortion as a function of temperature.

For instance, for a nip half-length of 0.2 inches, 600 dpi voxel resolution, and 15 psi average pressure, the maximum allowable dwell time $\tau_{dist}$ (time-to-distort) is illustrated in FIG. 9. In comparison, the reptation time for two ABS surfaces to inter-diffuse may be represented by Equation 17:

$$\tau_{rep} = \frac{12\eta}{\pi^2 G_n} \quad \text{(Equation 17)}$$

where $G_n$ is the plateau modulus (e.g., 400,000 Pascal-seconds for ABS).

Figure 10:
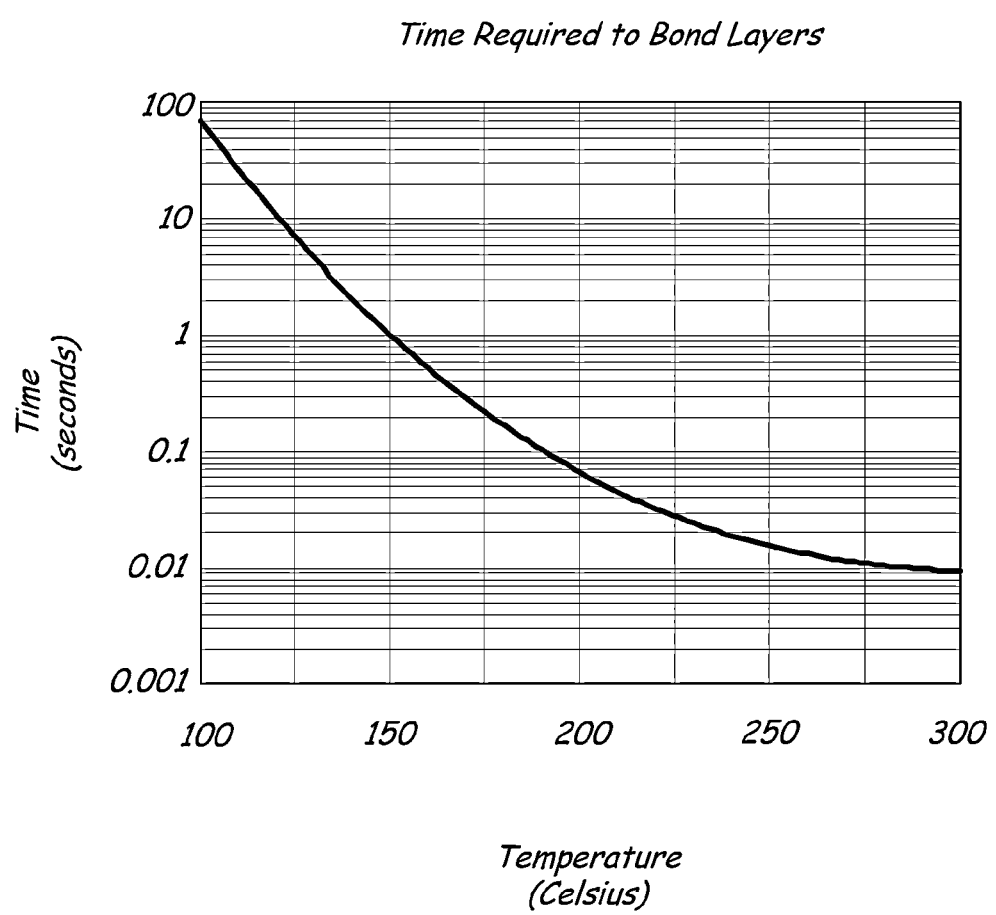
FIG. 10 is a graphical plot of time versus temperature for the example ABS material, illustrating the time required to achieve interlayer bonding as a function of temperature.

The time required for two layers to become sufficiently interdiffused is believed to be about three reptation times, which is described in FIG. 10. As shown, if the layers are expected to achieve this level of reptation during a single layer transfusion step, a part temperature of about 140° C. or greater is required. However, in comparison, if 3D part 74 is held at about 100° C. or greater, the layers will become sufficiently interdiffused in less than two minutes.

Accordingly, if layers 64 of the powder-based materials are sufficiently sintered before they are overlayed onto 3D part 74, the primary process trade-off is to have 3D part 74 both cool enough such that nip roller 72 does not distort it, and hot enough such that curl is controlled and the polymers of the overlayed sintered films 64*f* achieve good reptation.

Figure 11:
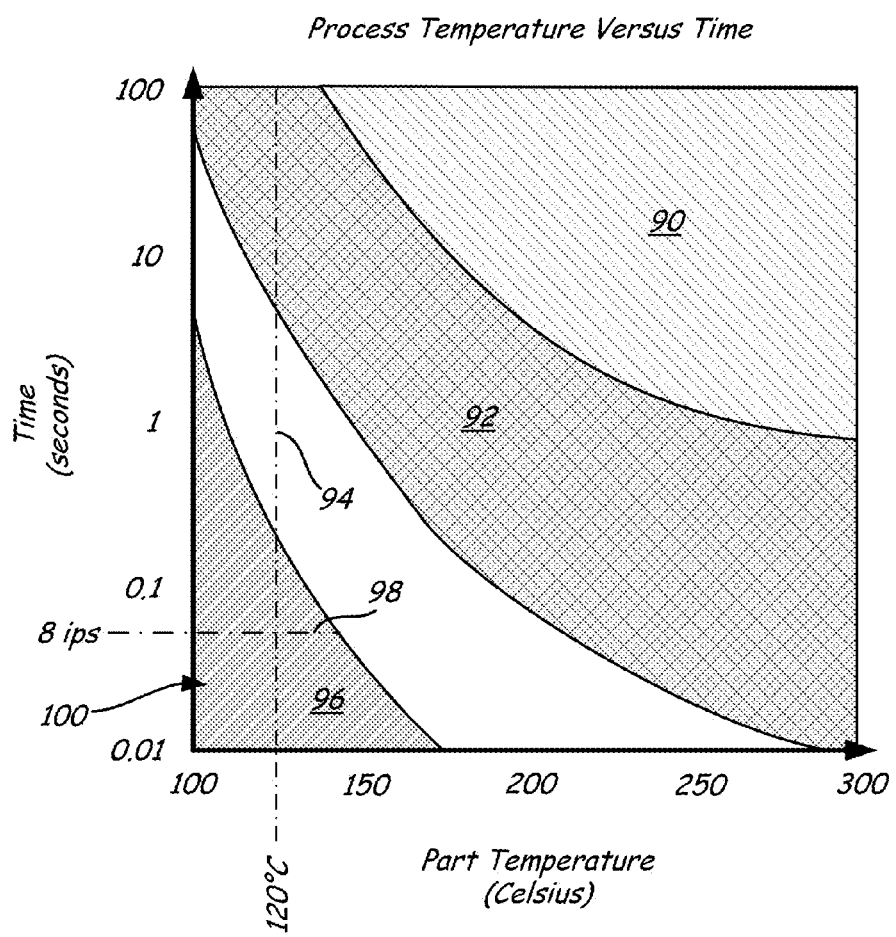
FIG. 11 is a graphical plot of example temperature process windows for the system with the example ABS material.

FIG. 11 illustrates example temperature process windows for system 10. As shown, region 90 in the upper right corner indicates the time-and-temperature window for sintering the powder-based material from the developed powder state into a sintered contiguous film (e.g., sintered film 64*f*). As can be appreciated from FIG. 11, at lower temperatures (e.g., below about 150° C.) and no applied pressure, the powder-based material will not sinter unless the duration is unreasonably increased (i.e., the printing speed approaches zero).

In comparison, however, the pre-sintered region 92 adjacent to region 90 shifts the useable temperature window down to manageable ranges. Region 92 represents the processing window where sintered layers 64*f*, which are placed into intimate contact with each other with little or no applied pressure, are capable of interdiffusing to achieve sufficient interlayer reptation. For instance, if the sintered layer 64f and 3D part 74 each has a temperature of about 120° C. without any applied pressure, interlayer bonding may occur in less than about 5 seconds, as illustrated by bonding line 94.

Finally, region 96 represents the processing window where nip roller 72 can press 3D part 74 at 30 psi without significant part distortion. Line 98 illustrates a printing speed of 8 inches/second (ips), and, when overlapped with bonding line 94, illustrates a preferred processing window 100 in the lower left corner for performing the pressing step with nip roller 72. As can be seen in FIG. 11, pre-sintering the developed layer 64 effectively shifts the useable temperature window down in the same manner as increasing the applied by a moderate amount, without actually requiring the applied pressure.

As such, layer 64 may be sintered at a high temperature for a sufficient duration to form a sintered contiguous film 64f, preferably by surface tension. This sintered film 64f is then allowed to cool down to a lower transfer temperature prior to reaching a pressing step at nip roller 72. Nip roller 72 may then press or otherwise place sintered film 64f into intimate contact with the build surface 76 of 3D part 74, which is preferably held at a suitable temperature, such as close to, but below its glass transition temperature. Furthermore, nip roller 72 may press with a low pressure, as discussed above.

Therefore, over the duration of the printing operation, as subsequent sintered films 64f are overlayed, the polymers of the given sintered film 64f and 3D part 74 continue to interdiffuse to achieve good polymer reptation (intralayer and interlayer) by the time the printing operation is completed. Moreover, because the sintered film 64f and 3D part 74 are maintained a moderately low temperatures, little or no part deformation occurs, and fast printing speeds may be maintained, such as printing speeds in the y-axis print direction ranging from about 2 inches/second to about 8 inches/second, or even faster.

Additionally, by performing the pressing step at lower temperatures and pressures, additional system hardware, such as pre-heaters, post-heaters, and cooling units for maintaining 3D part 74 at an average part temperature may be reduced, or in some embodiments, entirely eliminated form system 10. This reduces the heating/cooling oscillations of 3D part 74, and confines the rapid thermal cycling to the sintered film 64f on belt 22. However, as mentioned above, in some alternative embodiments, layer transfusion assembly 20 may also optionally include one or more post-fuse heaters and air jets (or other cooling units), and/or other arrangements (e.g., press plates, multiple rollers, etc. . . . ) as described in Comb et al., U.S. Publication Nos. 2013/0186549 and 2013/0186558.

Furthermore, because sintered film 64f is a contiguous film that is cooled to the desired transfer temperature, when sintered film 64f is pressed into intimate contact with the build surface 76 of 3D part 74, the contiguous nature of sintered film 64f may reduce or even eliminate the need for underlying supports. In other words, sintered film 64f may effectively bridge underlying gaps of 3D part 74, which can reduce support material requirements in many applications.

Figure 12:
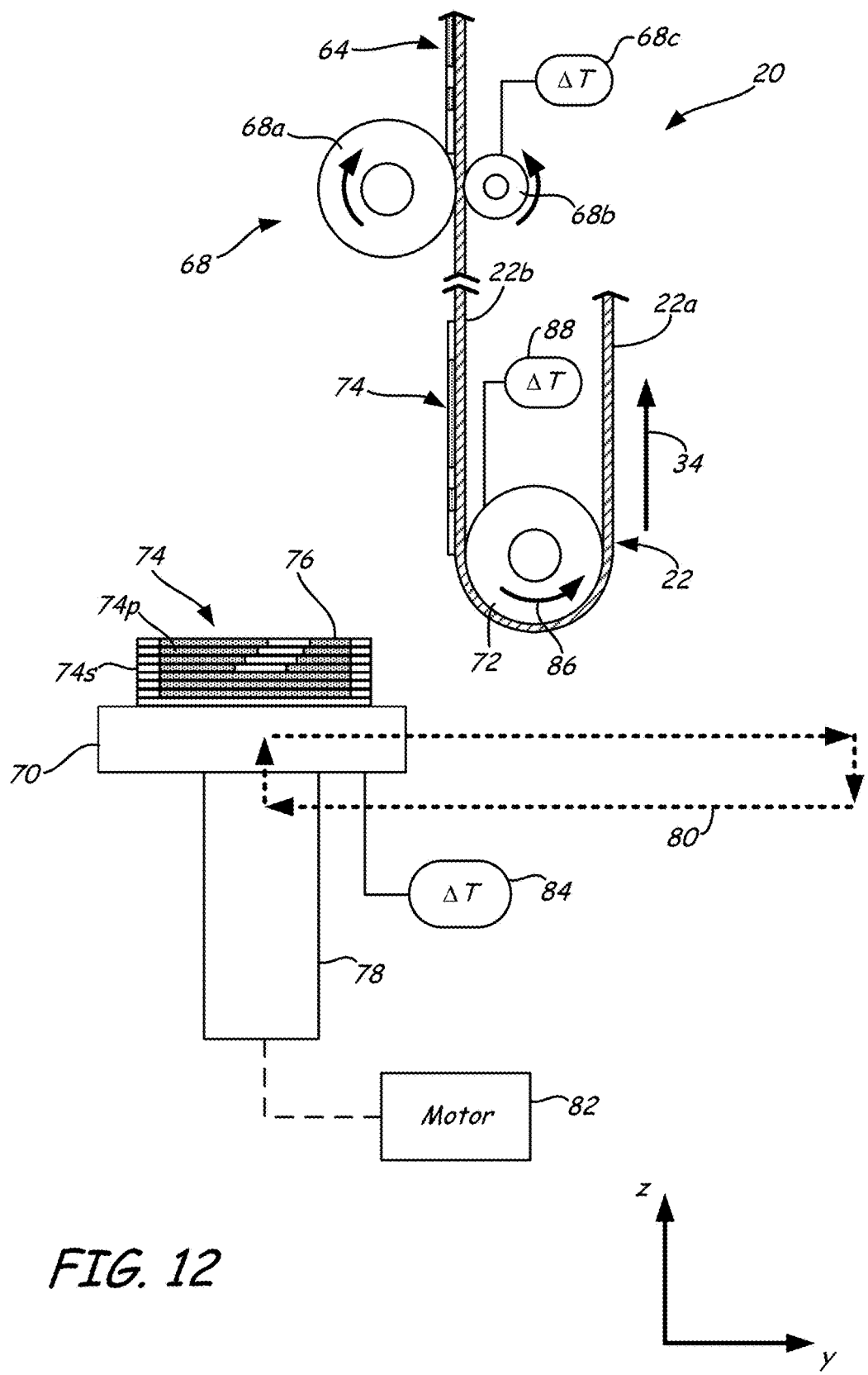
FIG. 12 is a schematic front view of an alternative layer transfusion assembly of the system for performing pre-sintering and pressing steps, where the pre-sintering step is performed with contact rollers.

In the above-discussed embodiment, pre-sintering heater 68 preferably incorporates a non-contact heater (e.g., an infrared heater), which does not apply any pressure to developed layer 64. Alternatively, as shown in FIG. 12, pre-sintering heater 68 may incorporate a roller arrangement of press roller 68a, backing roller 68b, and heating element 68c.

In this embodiment, heating element 68c may heat backing roller 68b to an elevated temperature to heat belt 22 and developed layer 64. Additionally, press roller 68a may apply a low amount of pressure to developed layer 64, such that the combination of the elevated temperature and low amount of applied pressure sinter the powder-based material of developed layer 64 into the sintered contiguous film 64f.

Positioning the heated roller (i.e., backing roller 68b) on the rear side 22b of belt 22 ensures that the belt surface energy will be the dominant sticky surface, as opposed to press roller 68a. Moreover, the surface curvature of belt 22 in the nip of press roller 68a and backing roller 68b also tends to retain the sintered film 64f on belt 22.

Accordingly, this roller embodiment allows sintered film 74 to exit pre-sintering heater 68 at a lower temperature than the embodiment shown above in FIG. 4. This correspondingly allows this roller embodiment to be placed closer to nip roller 72 since sintered film 64f will not need as long to cool down to the desired transfer temperature. In addition, because infrared heating is not required for this roller embodiment, the powder-based material may optionally be free of infrared-absorbing materials (e.g., carbon black), allowing different colored pigments and dyes to be incorporated in the composition.

System 10 is suitable for use with a variety of different powder-based thermoplastic part and support materials. Examples of suitable materials include those discussed in Martin, U.S. patent application Ser. Nos. 13/944,472; 13/944,478; and 13/944,483; Jaker et al. U.S. patent application Ser. No. 13/951,629; and Rodgers, U.S. patent Ser. No. 14/077,703. In some embodiments, system 10 is particularly suitable for use with polyamide nylon-type materials such as polycarpolactum (PA6), polyhexamethyleneaidpamide (PA6,6), polyhexamethylenenonamide (PA6,9), polyhexamethylenesebacamide (PA6,10), polyenantholactum (PA7), polyundecanolactum (PA11), polylaurolactam (PA12), and mixtures thereof.

Although the present disclosure has been described with reference to preferred embodiments, workers skilled in the art will recognize that changes may be made in form and detail without departing from the spirit and scope of the disclosure.

The invention claimed is:

1. An additive manufacturing system for printing a three-dimensional part, the additive manufacturing system comprising:
   one or more electrophotography engines configured to develop the layers of the three-dimensional part from a part material;
   a transfer belt configured to receive the developed layers from the one or more electrophotography engines;
   a pre-sintering heater configured to heat and press the developed layers to a sintering temperature and to sinter the developed layers on the transfer belt to provide sintered contiguous films;
   a build platform;
   a pressing element configured to engage with the transfer belt downstream of the pre-sintering heater to press the sintered contiguous films into contact with an intermediate build surface of the three-dimensional part on the build platform in a layer-by-layer manner;
   wherein the pre-sintering heater is located upstream along the transfer assembly a distance from the pressing element such that the sintered contiguous films cool down to a transfer temperature, which is about 50° C. to 120° C. less than the sintering temperature, prior to reaching the pressing element.

2. The additive manufacturing system of claim 1, wherein the pressing element comprises a nip roller.

3. The additive manufacturing system of claim 2, wherein the pressing assembly further comprises a heating element configured to heat the nip roller to a temperature that is within about 15° C. below a glass transition temperature of the part material.

4. The additive manufacturing system of claim 1, wherein the pressing element is configured to press the sintered films with an applied pressure that is less than about 30 pounds-per-square-inch.

5. The additive manufacturing system of claim 4, wherein the applied pressure is less than about 10 pounds-per-square-inch.

6. The additive manufacturing system of claim 1, pre-sintering heater comprises a non-contact heater.

7. The additive manufacturing system of claim 1, pre-sintering heater comprises a press roller, a backing roller, and a heating element configured to heat the backing roller, wherein the press roller and the backing roller engage the developed films and the transfer assembly.

8. The additive manufacturing system of claim 1, wherein each of the one or more electrophotography engines includes a development station retaining a supply of the part material, which comprises an acrylonitrile-butadiene-styrene copolymer, and wherein the transfer temperature ranges from about 100° C. to about 130° C.

9. An additive manufacturing system for printing a three-dimensional part, the additive manufacturing system comprising:
 one or more electrophotography engines configured to develop a layer of the three-dimensional part from a part material comprising an acrylonitrile-butadiene-styrene copolymer;
 a transfer belt configured to receive the developed layer from the one or more electrophotography engines;
 a pre-sintering heater configured to sinter the developed layer on the transfer belt to provide sintered contiguous films;
 a nip roller engaged with the transfer belt at a location downstream from the pre-sintering heater such that the sintered contiguous film cools down to a temperature ranging from about 100° C. to about 130° C. prior to reaching the nip roller.

10. The additive manufacturing system of claim 9, and further comprising a heating element configured to heat the nip roller to a temperature that is within about 15° C. below a glass transition temperature of the part material.

11. The additive manufacturing system of claim 9, wherein the pre-sintering heater is configured to sinter the developed layer by heating the developed layer to a temperature ranging from about 180° C. to about 220° C.

12. The additive manufacturing system of claim 11, wherein the pre-sintering heater is configured to sinter the developed layer without apply pressure to the developed layer.

13. The additive manufacturing system of claim 9, and further comprising pressing the cooled sintered contiguous film into contact with an intermediate build surface of the three-dimensional part with an applied pressure that is less than about 30 pounds-per-square-inch.

14. A method for printing a three-dimensional part with an additive manufacturing system, the method comprising:
 producing a developed layer of a part material with one or more electrophotography engines of the additive manufacturing system;
 transferring the developed layer from the one or more electrophotography engines to a transfer assembly of the additive manufacturing system;
 sintering the developed layer at the transfer assembly to produce a sintered contiguous film including heating the developed layer to a sintering temperature;
 actively cooling the sintered contiguous film down to a transfer temperature, which is about 50° C. to 120° C. less than the sintering temperature.

15. The method of claim 14, wherein the part material comprises an acrylonitrile-butadiene-styrene copolymer, and wherein sintering the developed layer comprises heating the developed layer to a temperature ranging from about 180° C. to about 220° C.

16. The method of claim 14, wherein the transfer temperature ranges from about 100° C. to about 130° C.

17. The method of claim 14, and further comprising pressing the cooled sintered contiguous film into contact with an intermediate build surface of the three-dimensional part with an applied pressure that is less than about 30 pounds-per-square-inch.

18. The method of claim 14, wherein the transfer assembly comprises a transfer belt having a line speed ranging from about 2 inches/second to about 8 inches/second.

19. The additive manufacturing system of claim 1, and further comprising a cooler, the cooler configured to actively cool the sintered contiguous films cool down to the transfer temperature.

20. The method of claim 14, and further comprising preheating the intermediate build surface of the layer prior to layer transfer.

* * * * *